June 16, 1953 M. A. WECKERLY 2,642,277
WEIGHING SCALE
Filed Sept. 7, 1951 3 Sheets-Sheet 1
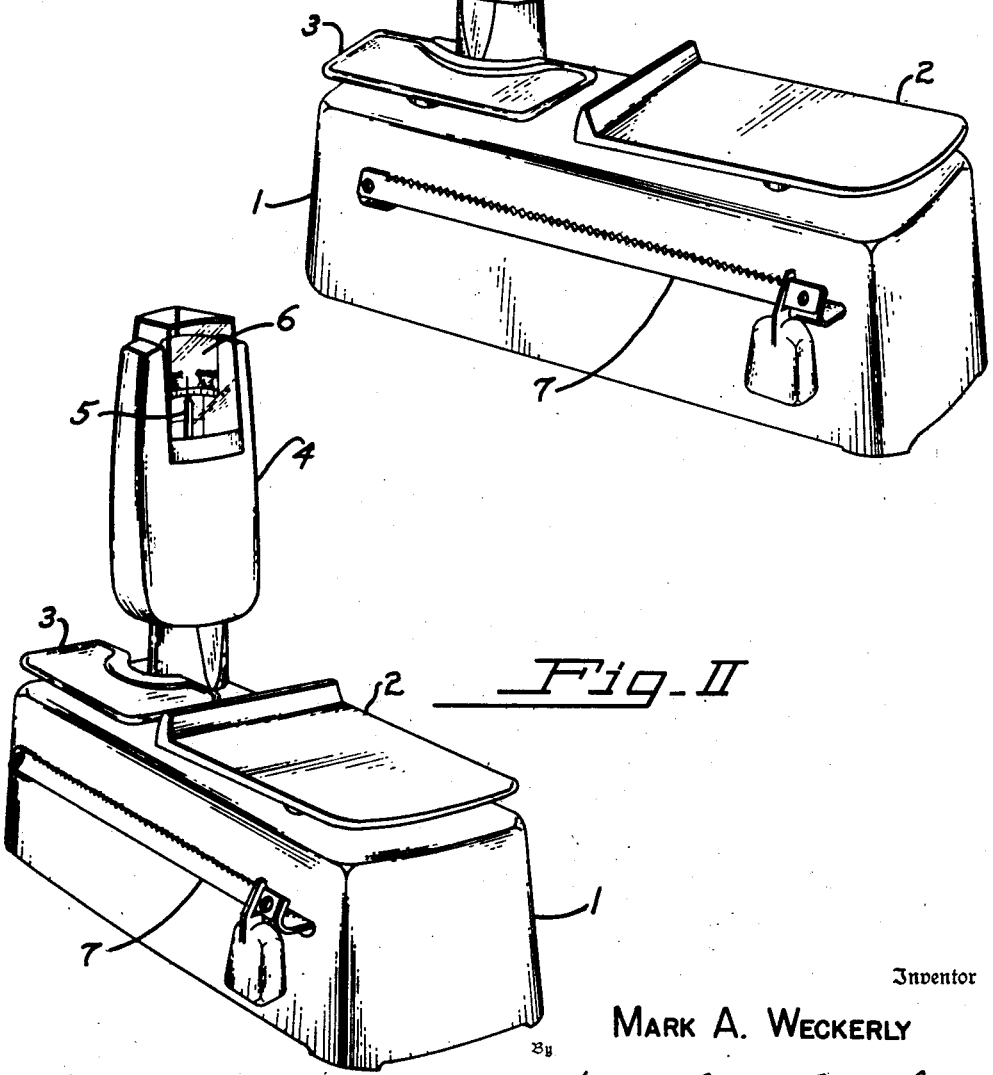
Fig. I
Fig. II
Inventor
MARK A. WECKERLY
By Marshall & Marshall
Attorneys

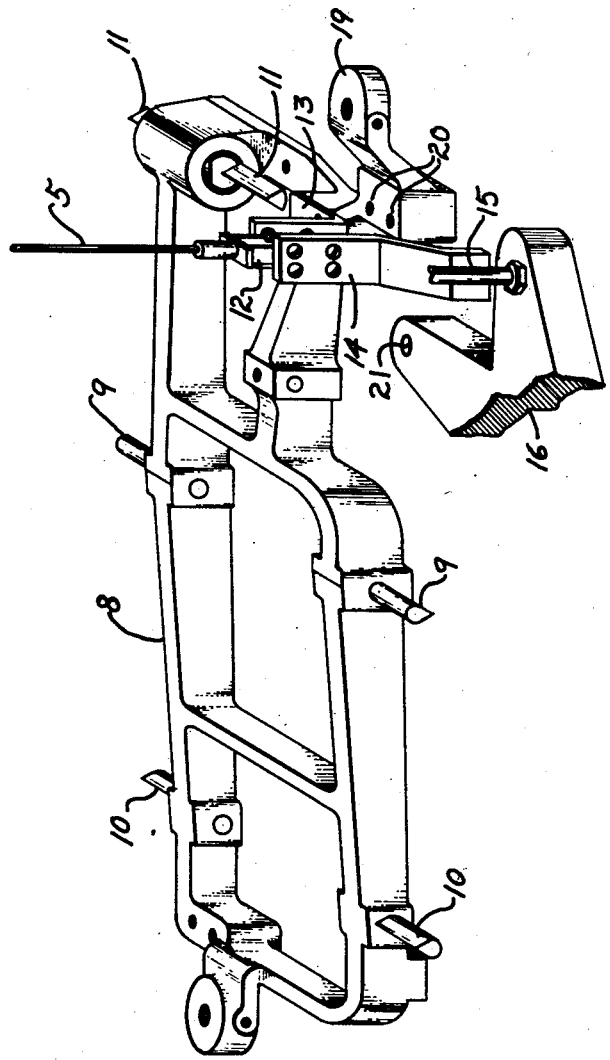

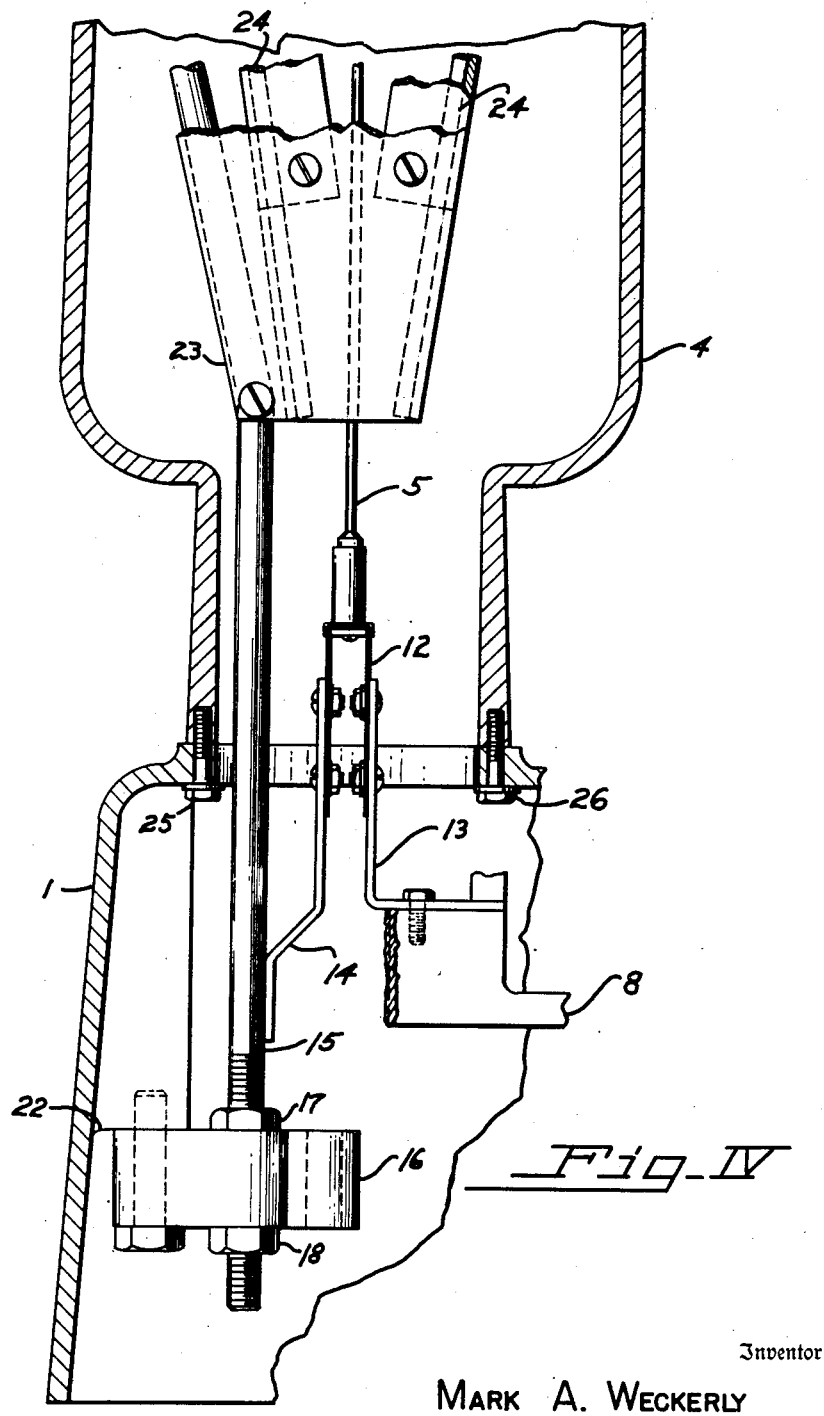

Patented June 16, 1953

2,642,277

UNITED STATES PATENT OFFICE 2,642,277

WEIGHING SCALE

Mark A. Weckerly, Toledo, Ohio, assignor to Toledo Scale Company, Toledo, Ohio, a corporation of New Jersey Application September 7, 1951, Serial No. 245,570

3 Claims. (Cl. 265—54)

This invention relates to weighing scales and in particular to a weighing scale of the predetermined weight type having the arrangement of an angularly positionable indicator tower and a counterpoise platter located side by side near one end of the base of the scale and a commodity platter located near the other end of the base.

It is necessary to manufacture small portable scales of the predetermined weight type in various sizes to satisfy all capacity needs. In the past, two models of each capacity generally were made, one having the indicator tower facing the long axis of the weighing scale and one having the indicator tower facing the short axis of the weighing scale. This, of course, resulted in making and carrying a double stock of parts.

The principal object of this invention is to provide a simple scale of the predetermined weight type that can be selectively assembled for either side or end weighing indication from the same parts, thus reducing the number of different parts necessary for manufacture and inventory.

A further object is the provision of a compact arrangement of commodity and counterpoise platters and an indicating tower in which both platters are very easily accessible and the weight indication is provided closely adjacent the commodity platter whether the scale is adapted for side or end weighing indications.

Another object is to provide a simple scale that can be easily converted by a serviceman for a customer to provide either side or end weighing indication if the customer's method of using the scale should change.

Another object is to provide a weighing scale of the predetermined weight type with platters and towers so arranged that the counterpoise platter can be made comparatively small and the commodity platter can be made comparatively large to provide as large a platter area for bulky commodities as is practicable.

A still further object is to provide a weighing scale that is simple and easy to manufacture.

The invention which attains the foregoing objects comprises a weighing scale of the predetermined weight type having an arrangement of a compact substantially rectangular base, an angularly positionable indicator tower surmounting the base near one corner thereof, a counterpoise platter spaced above the base and being adjacent the tower at the same end of the base as the tower, the counterpoise platter and the tower being spaced from each other across the short axis of the base, and a comparatively large commodity platter spaced above and occupying the remainder of the space above the base but not overhanging the edges thereof. The commodity platter occupies a portion slightly more than half of the area above the base to accommodate the weighing of large bulky objects. The weighing scale may be assembled from the same parts as an end or as a side indicating scale having a maximum of commodity platter area for a given size of base and having the weight indications provided closely adjacent the commodity platter regardless of whether the scale is arranged for end or side indicating. After the scale is assembled, no extra parts are needed for turning the tower and changing the direction of indicator travel to convert the scale from one providing side indication to one providing end indication.

A preferred embodiment of the invention is illustrated in the accompanying drawings.

In the drawings:

Figure I is a perspective view of a weighing scale incorporating the improved arrangement of tower and platters. The tower is shown positioned for side indication.

Figure II is a perspective view of the weighing scale illustrated in Figure I with the tower positioned for end indication.

Figure III is a perspective view of the lever and an adjacent part of the frame of the weighing scale showing means for alternatively positioning the indicating mechanism and the indicator tower rod.

Figure IV is a fragmentary elevational view showing parts of the tower, the base and the indicating mechanism of the weighing scale.

These specific figures and the accompanying descriptions are intended merely to illustrate the invention but not to impose limitations on the claims.

Referring first to the arrangements shown in Figure I and Figure II, the scale has a rectangular box-like base 1 with rounded corners and a rounded upper edge. The base 1 is surmounted by a commodity platter 2, a counterpoise platter 3 and an indicator tower 4 which is angularly positionable about its vertical axis. Neither the platters 2 and 3 nor the tower 4 at any time overhang the edges of the top of the base. An indicator 5 extending upwardly within the indicator tower 4 cooperates with a chart 6 to indicate the condition of balance between the loads on the platters 2 and 3.

Figure I shows the indicator tower 4 positioned for side weighing indication. Figure II shows the indicator tower 4 positioned for end weighing indication. It will be noticed that in each of these arrangements, both platters are readily accessible to the scale operator, and in each instance the weight indication is closely adjacent the commodity platter for easier operation.

This weighing scale is of the "over-under" type. The most important use of the scale is in checkweighing articles such as packaged commodities. Counterweights are placed on the counterpoise platter 3 and a tare beam 7 is adjusted until the combined weight of the counterweights and the weight effect of the tare beam 7 equals the desired weight of an article to be checked. The article is set on the commodity platter 2 and any disparity between the actual weight and the desired weight will be indicated on the "over-under" chart 6.

The scale can also be used as a regular weighing scale. Loads to be weighed are placed on the commodity platter 2 and one or more of a series of known counterweights are placed on the counterpoise platter 3 until the indicator 5 indicates a condition of balance. The tare beam 7 can be used in conjunction with the counterweights or, when small loads are being weighed, in place of the counterweights.

As illustrated in Figure III, an equal arm lever 8 has knife-edge fulcrum pivots 9 fixedly secured thereto which pivots are fulcrumed on bearings (not shown) inside the base 1. Also fixedly secured to the lever 8 is a pair of pivots 10 for supporting the commodity platter assembly and a second pair of pivots 11 for supporting the counterpoise platter assembly. The indicator 5 is shown mounted to move in a plane parallel to a vertical plane passing through the fulcrum axis of the lever 8.

The indicator 5 is mounted on and driven by a U-shaped resilient member 12 the ends of which are fastened to brackets 13 and 14. The bracket 13 is secured to the lever 8 by means of two screws threaded into tapped holes in the lever 8. The other bracket 14 is welded to a rod 15 one end of which is threaded and inserted through a hole in a stationary frame arm 16 which is fixed to the base. The rod 15 is held in the hole by means of two nuts 17 and 18 (Figure IV) turning on the threaded portion of the rod 15, one nut being on each side of the arm 16. Thus one end of the resilient member 12 is fixedly secured to the frame while the other end moves with the lever 8. Relative movement between the lever 8 and the base 1 therefore causes the U-shaped resilient member 12 to move the indicator in a manner more fully described in my co-pending application Serial No. 731,751, now Patent 2,584,949.

A load applied to the commodity platter 2 causes the end of the lever 8 to which the indicator 5 is attached to rise thus moving the end of the resilient member 12 attached to the bracket 13 upwardly. Movement of the resilient member 12 drives the indicator 5 over the chart 6 to the side of the chart 6 reading "over." Counterweights applied to the counterpoise platter 3 drive the indicator in the opposite direction.

The direction of indicator travel can be changed from end indication, as shown in Figure II, to side indication, as shown in Figure I. This can be accomplished by unfastening the bracket 13 from the lever 8 and the rod 15 from the arm 16 and turning them both 90° about a vertical axis. The bracket 13 is then fastened to an extension 19 of the lever 8 by means of bolts screwed into holes 20, while the rod 15 is inserted through a hole 21 in the frame arm 16 and the nut 18 is replaced on the threaded end of the rod 15. The same parts can be used to secure the bracket 13 and the rod 15 in either of the alternative positions.

Referring to Figure IV, the inwardly projecting frame arm 16 which supports the upstanding rod 15 is firmly secured to a rib 22 on the inside of the base 1. A fan-shaped plate 23 holding indicator stops 24 and the scale chart 6 are mounted on the rod 15. When it is desired to change the plane in which the indicator travels and the position of the rod 15 is changed, as previously described, the rod 15 carries along the fan-shaped plate 23, the indicator stops 24 and the scale chart 6 to the new position. The angularly positionable indicator tower 4 is secured to the base 1 by means of bolts 25 and 26 screwed through the base 1 into the bottom of the tower 4. If the direction of travel of the indicator 5 is changed, the position of the tower 4 is changed to coincide by removing the bolts 25 and 26, turning the tower 4 and replacing the bolts in suitable holes provided in the tower 4.

The invention thus consists in providing such an arrangement of platters and positionable tower in a predetermined weight type scale that either a side indicating or an end indicating scale can be assembled from the same parts and the platters and tower are compactly situated for ease of operation. One type provides for indicator movement in a plane parallel to a vertical plane passing through the long axis of the scale as shown in Figure I, and the other type provides for indicator movement in a plane parallel to a vertical plane passing through the short axis of the weighing scale as shown in Figure II.

It may be seen that the weighing scale can be quickly converted from one having side indication to one having end indication, or vice versa, by using the same parts. The chart 6 is fixed to the base 1 through the rod 15 and the arm 16 to prevent any inaccuracies which might arise from the changeover from one indication to another if the chart 6 was attached to the tower 4 and the tower was not properly assembled on the base 1. The indicator 5 is attached to the lever 8 and the rod 15 so that positioning of the tower as previously mentioned has no effect on the relationship between the indicator 5 and the lever 8.

Various modifications and changes may be made in the details of construction without departing from the spirit and scope of the invention.

Having described the invention, I claim:

1. In a weighing scale, in combination, a base of a generally rectangular box-like structure, a generally rectangular flat commodity platter of a width approximately the same as the width of the base and of a length slightly more than half of the length of said base, said commodity platter being spaced above and parallel to the top of the base and having three of its edges approximately aligned with two sides and one end of the base, a generally rectangular flat counterpoise platter of a width slightly more than half of the width of the base, said counterpoise platter being spaced above the top of the base so as to be generally coplanar with the commodity platter, said counterpoise platter occupying the space to one side of the top of the base of the space not occupied by the commodity platter, weighing mechanism within the base for supporting the platters, an indicating tower vertically surmounting the base from the portion of the top of the base not occupied by said platters, indicating mechanism operatively connected to the weighing mechanism which indicating mechanism is located within the tower, said tower and said indicating mechanism being adapted to face either in the direction of the counterpoise platter or in the direction of the commodity platter by adjusting the tower 90° about its vertical axis, and a beam and poise operatively connected to the weighing mechanism, said beam and poise being carried at the side of the base along which the counterpoise platter is mounted.

2. In a weighing scale, in combination, a base, a commodity platter generally equal in width to the base and at least half the length of the base, the commodity platter overlying the base at one end thereof but not having its edges overhanging the base, a counterpoise platter at least half the width of the base and slightly shorter than the distance between the commodity platter and the end of the base not occupied by the commodity platter, said counterpoise platter overlying the portion of the base not occupied by the commodity platter along one side of the top of the base, weighing mechanism within the base for supporting the platters, indicating mechanism operatively connected to the weighing mechanism, said indicating mechanism comprising an indicator extending vertically through an opening in the top of the base in the area not occupied by the platters and a chart cooperating with said indicator, said chart being mounted on a rod extending alongside the indicator which rod is adjustably fixed to the base, and an indicating tower enclosing said indicating mechanism, said tower having an opening through which weight indications may be viewed, said indicating mechanism and said tower being so constructed whereby upon rotation of 90° about a vertical axis they may be arranged to provide indications for viewing either from the end of the scale across the commodity platter or from the side of the scale across the counterpoise platter.

3. The invention set forth in claim 2 including a horizontal beam operatively connected to the weighing mechanism, said beam lying closely adjacent the side of the base from which weight indications may be viewed when the tower and indicating mechanism are arranged to be viewed across the counterpoise platter, and a poise carried on the beam and cooperating therewith.

MARK A. WECKERLY.

References Cited in the file of this patent

UNITED STATES PATENTS

| Number | Name | Date |
|---|---|---|
| 299,757 | Du Brul | June 3, 1884 |
| 1,645,328 | Hopkinson | Oct. 11, 1927 |
| 1,742,585 | De Brouckere | Jan. 7, 1930 |
| 2,029,902 | Waltz | Feb. 4, 1936 |
| 2,316,947 | Flanagan | Apr. 20, 1943 |
| 2,582,517 | Williams | Jan. 15, 1952 |
| 2,584,949 | Weckerly | Feb. 5, 1952 |